US008139940B2

(12) United States Patent
Harada

(10) Patent No.: US 8,139,940 B2
(45) Date of Patent: *Mar. 20, 2012

(54) WAVELENGTH DIVISION MULTIPLEXING TRANSMISSION SYSTEM AND REMOTE APPARATUS AND STATION APPARATUS USED THEREIN

(75) Inventor: Shigekazu Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 12/630,952

(22) Filed: Dec. 4, 2009

(65) Prior Publication Data

US 2010/0142953 A1    Jun. 10, 2010

(51) Int. Cl.
*H04J 14/00* (2006.01)

(52) U.S. Cl. ............... 398/68; 398/66; 398/67; 398/69; 398/70; 398/71; 398/72; 398/95; 398/151; 398/153; 398/196

(58) Field of Classification Search ............. 398/66–72, 398/85, 151, 153, 168, 196, 197
See application file for complete search history.

(56) References Cited

U.S. PATENT DOCUMENTS

| 5,212,577 | A | * | 5/1993 | Nakamura et al. ............ 398/79 |
| 5,774,244 | A | * | 6/1998 | Tandon et al. ................ 398/67 |
| 5,808,767 | A | * | 9/1998 | Williams et al. .............. 398/70 |
| 5,949,562 | A | * | 9/1999 | Kubota et al. ................ 398/79 |
| 5,956,166 | A | * | 9/1999 | Ogata et al. .................. 398/69 |
| 6,101,014 | A | * | 8/2000 | Majima ......................... 398/69 |
| 6,850,711 | B2 | * | 2/2005 | Tsuruta ......................... 398/168 |
| 2001/0004290 | A1 | * | 6/2001 | Lee et al. ...................... 359/124 |
| 2003/0020977 | A1 | * | 1/2003 | Smith et al. .................. 359/110 |
| 2003/0118280 | A1 | * | 6/2003 | Miyazaki et al. ............. 385/24 |
| 2005/0163503 | A1 | * | 7/2005 | Lee et al. ...................... 398/19 |

FOREIGN PATENT DOCUMENTS

| JP | 63-227139 | 9/1988 |
| JP | 02-056130 | 2/1990 |
| JP | 03-214832 | 9/1991 |
| JP | 03-214938 | 9/1991 |
| JP | 6-296288 | 10/1994 |
| JP | 09-018596 | 1/1997 |

(Continued)

OTHER PUBLICATIONS

The office issued by the Japanese Patent Office on Dec. 25, 2007, with an English language translation, pp. 1 to 6.

(Continued)

*Primary Examiner* — Li Liu
(74) *Attorney, Agent, or Firm* — Whitham Curtis Christofferson & Cook, PC

(57) ABSTRACT

There is provided a wavelength division multiplexing transmission system and apparatuses used therein, in which a remote apparatus to be newly added to a station apparatus autonomously sets a wavelength to be used in the remote apparatus, thereby avoiding the need for presetting a wavelength to be used in the remote apparatus. The remote apparatus includes wavelength determining means that determines an available wavelength on the basis of an optical signal received from the station apparatus. The wavelength determining means may determine the wavelength of an unreceived optical signal as the available wavelength or may determine the wavelength of a received optical signal as the available wavelength, and may set that wavelength as a transmission and reception wavelength to be used in the remote apparatus.

8 Claims, 3 Drawing Sheets

FOREIGN PATENT DOCUMENTS

| | | |
|---|---|---|
| JP | 09-023227 | 1/1997 |
| JP | 09-083491 | 3/1997 |
| JP | 9-83491 | 3/1997 |
| JP | 2000-4461 | 1/2000 |
| JP | 2000-068982 | 3/2000 |
| JP | 2000-156702 | 6/2000 |
| JP | 2002-190790 | 7/2002 |
| JP | 2003-9112 | 1/2003 |

OTHER PUBLICATIONS

Japanese Office Action with English Translation, Oct. 6, 2009.

\* cited by examiner

WAVELENGTH DIVISION MULTIPLEXING TRANSMISSION SYSTEM AND REMOTE APPARATUS AND STATION APPARATUS USED THEREIN

BACKGROUND OF THE INVENTION

1. Field of the Invention

The present invention relates to a wavelength division multiplexing (WDM) transmission system and a remote apparatus and a station apparatus used therein and, in particular, to a wavelength division multiplexing transmission system in which a plurality of remote apparatuses are connected to a station apparatus in a star or tree topology, and the remote apparatuses and the station apparatus used therein.

2. Description of the Related Art

The widespread use of the Internet has brought about the explosion in demand for data communications. WDM transmission systems are used in order to efficiently increase communication traffic.

Examples of network system configurations include a star system configuration in which a number of remote apparatuses are connected to one station apparatus and a tree system configuration in which a number of remote apparatuses are connected to each other through a relay point such as a star coupler.

FIG. 1 shows a block diagram of a prior-art wavelength multiplexing transmission systems. Referring to FIG. 1, a wavelength division multiplexing transmission system includes a station apparatus 10, a plurality of remote apparatuses 20-1-20-$n$ (wherein n is a positive integer), a wavelength demultiplexer 7 connected between the station apparatus 10 and the plurality of remote apparatuses 20-1-20-$n$, and a wavelength multiplexer 8. In this way, the station apparatus 10 and the plurality of remote apparatuses 20-1-20-$n$ are connected to each other through the wavelength demultiplexer 7 and the wavelength multiplexer 8 in a star topology.

The station apparatus 10 includes a plurality of optical transmitters 101-10$n$ a plurality of optical receivers 111-11$n$, a wavelength multiplexer 3 which outputs signals 1011 to 10$n$1 provided from the optical transmitters 101-10$n$ as wavelength multiplexed optical signals, and a wavelength demultiplexer 4 which demultiplexes a wavelength multiplexed optical signal 2020 and outputs the resulting signals to the optical receivers 111 to 11$n$. The wavelength demultiplexer 7 demultiplexes a wavelength multiplexed optical signal 2010 provided from the wavelength multiplexer 3 of the station apparatus 10 and outputs the resulting signals. The wavelength multiplexer 8 multiplexes individual optical signals 2021-202$n$ and outputs the resulting signal to the wavelength demultiplexer 4 of the station apparatus 10. A remote apparatus 20-1 includes an optical receiver 220-1 which receives an optical signal 2011 among signals provided from the wavelength demultiplexer 7, an optical transmitter 230-1 which outputs each individual optical signal 2021 to the wavelength demultiplexer 8, and wavelength controller 240-1 which controls the wavelengths of optical signals to be transmitted from the optical transmitter 230-1. The configurations of remote apparatuses 20-2-20-$n$, which are not shown, are similar to the configuration of the remote apparatus 20-1. Each of the remote apparatuses has an optical receiver 220-2-220-$n$ which receives a signal 2012-201$n$ among signals provided from the wavelength demultiplexer 7, an optical transmitter 230-2-230-$n$ which transmits each individual optical signal 2022-202$n$ to the wavelength multiplexer 8, and a wavelength controller 240-2-240-$n$ which controls the wavelengths of optical signals to be transmitted from the optical transmitter 230-2-230-$n$.

Shown in FIG. 1 is the addition of a remote apparatus 20-$m$ (m is any positive integer within the range from 1 to n) to the prior-art wavelength division multiplexing transmission system. The optical transmitter 230-$m$ of the newly added remote apparatus 20-$m$ contains a wavelength tunable laser. The output wavelength of the wavelength tunable laser must be controlled so as to be the wavelength assigned to the remote apparatus 20-$m$ through the use of a wavelength controller.

Another example of wavelength division multiplexing transmission systems of this type is described in Japanese Patent Laid-Open No. 9-83491 (paragraph 0016 and FIG. 2, hereinafter referred to as a first patent document), which is a wavelength division multiplexing communication network on which a line monitoring node is provided. The line monitoring node searches through wavelengths on the network. If the line monitoring node detects an unused wavelength, it transmits a signal indicating that the wavelength is unused. If the line monitoring node later detects in that wavelength a signal other than the signal indicating that the wavelength is unused, it ends the transmission of the signal indicating that the wavelength is unused and searches for another unused wavelength on the network.

However, in the prior-art system shown in FIG. 1 and described above, each time a new remote apparatus is installed, a wavelength to be used in that system must be set by a maintainer or other personnel. Therefore, the system has a problem in that man-hours for such maintenance tasks are required and it takes time for a new remote apparatus to start operation.

The technology described in the first patent document requires a dedicated line monitoring node for detecting an unused wavelength. Accordingly, it requires an arrangement and operation for notifying a remote node (which is equivalent to a remote apparatus of the prior art herein) of the unused wavelength detected by the line monitoring node. Furthermore, because bidirectional communication relating to information about unused wavelengths must be performed between remote nodes, collisions between signals may occur and action must be taken to handle them. As described above, the technology disclosed in the first patent document has a problem in that the technology requires a complex arrangement, operation, and processing.

BRIEF SUMMARY OF THE INVENTION

An object of the present invention is to provide a wavelength division multiplexing transmission system that does not require maintenance tasks for setting beforehand in a remote apparatus a wavelength to be used in that remote apparatus and to provide a remote apparatus and a station apparatus used in the system.

According to the present invention, there are provided a wavelength division multiplexing transmission system in which a plurality of remote apparatuses are connected to a station apparatus and transmission and reception are performed between the apparatuses, and a remote apparatus and a station apparatus used in the system, wherein the remote apparatus includes wavelength determining means for determining an available wavelength on the basis of an optical signal received from the station apparatus.

The wavelength determining means may determine the wavelength of an unreceived optical signal as the available wavelength and set it as the transmission and reception wavelength to be used in the remote apparatus. Alternatively, the wavelength determining means may determine the wavelength of a received optical signal as the available wavelength and set it as the transmission and reception wavelength to be used in the remote apparatus. Furthermore, the wavelength determining means may include wavelength separating means that sequentially separates optical signals having particular wavelengths from an optical signal including a plurality of wavelengths, optical reception means that outputs a reception status signal indicating whether or not a separated optical signal is being received, wavelength control means that identifies an unused wavelength on the basis of the reception status signal, sets the unused wavelength as the transmission and reception wavelength, and outputs a wavelength control signal for setting the wavelength, and optical transmission means whose output wavelength is adjusted to the unused wavelength according to the wavelength control signal.

The station apparatus may include optical output control means that determines a wavelength to be used on the basis of an optical signal received from a remote apparatus.

The transmission system and its apparatuses according to the present invention do not require a separate apparatus for detecting unused wavelength. Instead, a remote apparatus that actually performs communication autonomously detects an unused wavelength. Moreover, the transmission system and its apparatus are low-cost because only remote apparatuses require a wavelength tunable filter and a wavelength tunable laser and the station apparatus does not require any wavelength tunable devices. Furthermore, the transmission system and its apparatuses do not have to transmit an extra signal for indicating a line is not in use. Unlike the system disclosed in the first document, the transmission system of the present invention does not cause a collision between signals. The configuration and operation of the transmission system and the apparatuses used therein according to the present invention differ from the technology shown in FIG. 1 and the technology described in the first patent document in the respects described above.

Another prior-art wavelength division multiplexing transmission system is an optical access system described in Japanese Patent Laid-Open No. 2000-068982 (paragraph 0013 and FIG. 2, hereinafter referred to as a second patent document), in which a wavelength controller is provided in a station. The system monitors variations in wavelength characteristics of an optical multiplexer-demultiplexer located at a remote node (which is equivalent to the wavelength demultiplexer and wavelength multiplexer of the prior art herein) to detect the amount of a wavelength shift. The oscillation wavelength of an optical transmitter in the station, the multiplexed/demultiplexed wavelength of an optical multiplexer-demultiplexer for transmission and multiplexer-demultiplexer for reception at the station, and the oscillation wavelength of optical transmitter at each subscriber location are shifted by the amount of the wavelength shift. The wavelength assigned to each subscriber set in the wavelength controller is changed each time a wavelength shift is detected. In this way, the technology described in the second patent document is intended to monitor variations in wavelength characteristics to detect the amount of a wavelength shift and make fine adjustments to wavelength according to the detected amount of the shift. In contrast, the present invention is intended to detect a wavelength to be assigned to each subscriber and assign the wavelength to each subscriber. Therefore, the technology described in the second patent document differs from the present invention in object, configuration, operation and effect.

The present invention eliminates the need for setting a given transmission wavelength beforehand because a remote apparatus autonomously determines an available wavelength based on an optical signal it has received from the station apparatus as described above.

BRIEF DESCRIPTION OF THE DRAWINGS

The above and other objects, features and advantages of the present invention will become more apparent from the following detailed description when taken in conjunction with the accompanying drawings, wherein.

DETAILED DESCRIPTION OF THE PREFERRED EMBODIMENTS

A basic configuration and the principle operation of a wavelength division multiplexing transmission system and a remote apparatus and station apparatus used therein according to the present invention will be described below.

Figure 1:
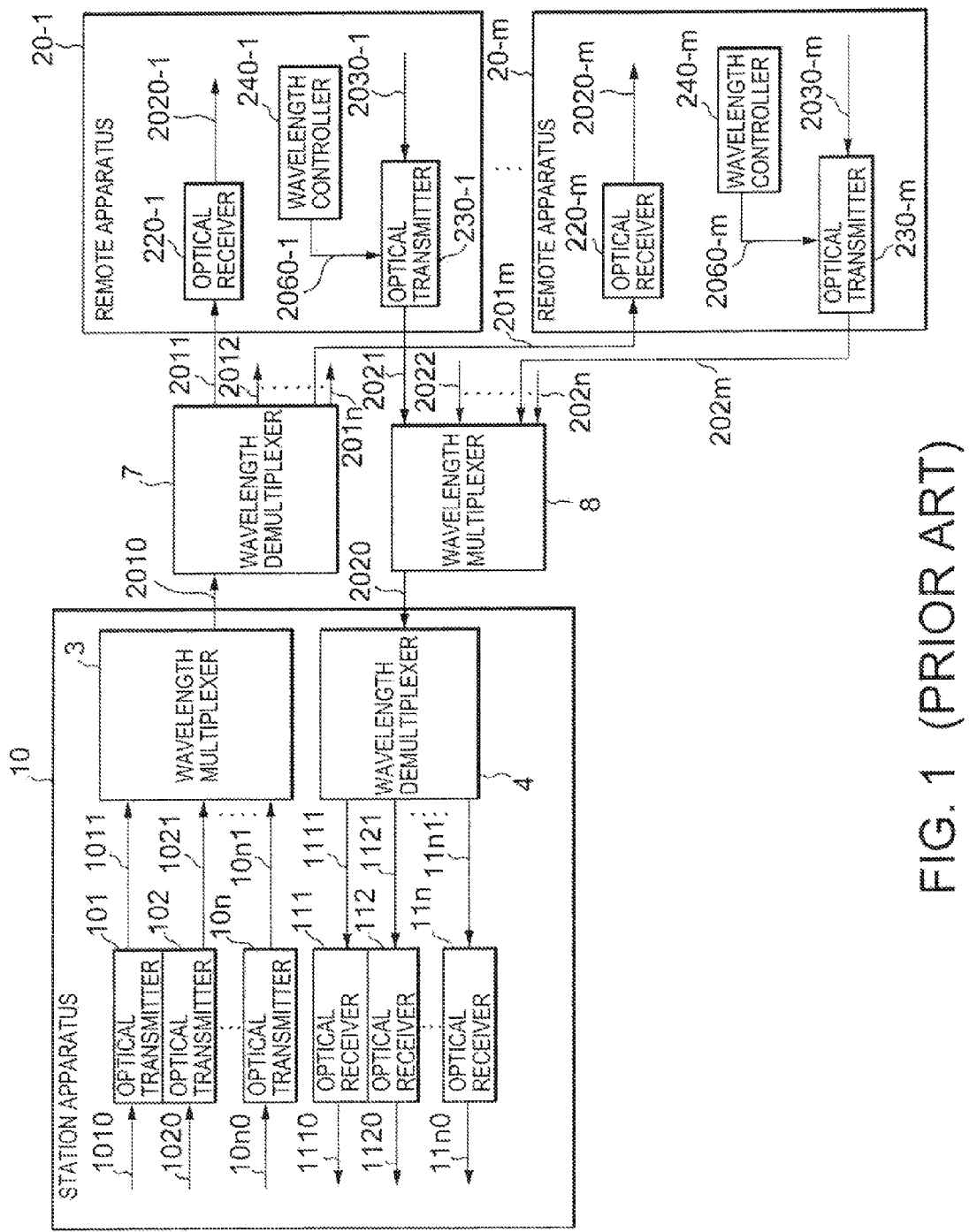
FIG. 1 is a block diagram showing a configuration of an exemplary wavelength division multiplexing transmission system according to the prior art.
Figure 2:
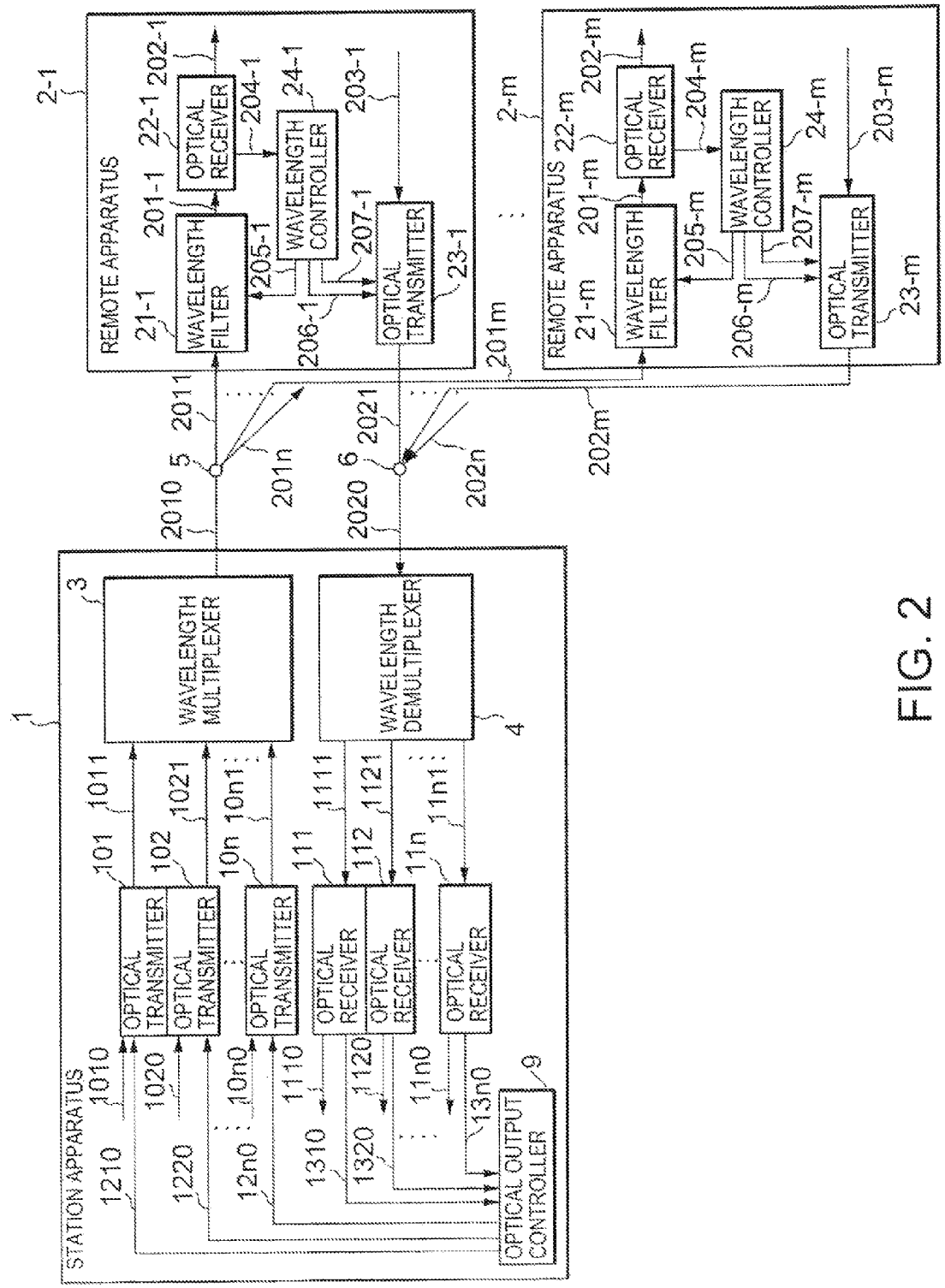
FIG. 2 is a block diagram showing a configuration of a wavelength division multiplexing transmission system according to a first embodiment of the present invention.

FIG. 2 is a block diagram of a wavelength division multiplexing transmission system and remote apparatuses and a station. apparatus therein according to a first embodiment of the present invention.

Referring to FIG. 2, the wavelength division multiplexing transmission system includes a station apparatus 1, a plurality of remote apparatuses 2-1-2-$n$ (where n is a positive integer and not all of them are shown), and optical couplers 5, 6 connected between the station apparatus 1 and the plurality of remote apparatuses 2-1-2-$n$. The station apparatus 1 and the plurality of remote apparatuses 2-1-2-$n$ are connected through the optical couplers 5, 6 in a star topology. The optical couplers 5, 6 perform optical branching and optical coupling at a branching ratio according to the number of remote apparatuses.

The station apparatus 1 includes a plurality of optical transmitters 101-10$n$, a plurality of optical receivers 111-11$n$, a wavelength multiplexer 3, and a wavelength demultiplexer 4. A remote apparatus 2-1 includes a wavelength filter 21-1, an optical receiver 22-1, an optical transmitter 23-1, and a wavelength controller 24-1.

In the remote apparatus 2-1 in FIG. 2, the wavelength filter 21-1 separates variable wavelengths. The wavelength filter 21-1 adjusts a wavelength to separate, according to a wavelength control signal 205-1 provided from the wavelength controller 24-1, and outputs it to the optical receiver 22-1. The optical receiver 22-1 converts an optical signal 201-1 inputted from the wavelength filter 21-1 into an electric signal 202-1 and outputs to the wavelength controller 24-1 an optical reception status signal 204-1 indicating whether an optical signal is received. The transmission wavelength of the optical transmitter 23-1 is variable. The optical transmitter 23-1 converts an electric signal 203-1 into an optical signal 2021, adjusts the transmission wavelength according to a wavelength control signal 206-1 provided from the wavelength controller 24-1, and turns on and off an optical output according to an optical output control signal 207-1. The wavelength controller 24-1 obtains an optical reception status signal 204-1 indicating a reception status from the optical receiver 22-1. The wavelength controller 24-1 outputs the wavelength control signal 206-1 and the optical output control signal 207-1 based on information indicated by the optical reception status signal 204-1 and thereby controls the wavelength and output of an optical signal to be transmitted by the optical transmitter 23-1. At the same time, the wavelength controller 24-1 outputs a wavelength control signal 205-1 to the wavelength filter 21-1 to control a wavelength to be separated.

In the station apparatus 1 in FIG. 2, the optical transmitters 101-10$n$ output optical signals 1011-10$n$1 having different wavelengths. The optical wavelength multiplexer 3 multiplexes the optical signals 1011 to 10$n$1 and outputs a wavelength-multiplexed optical signal 2010. The wavelength demultiplexer 4 receives a wavelength-multiplexed optical signal 2020 outputted from the optical coupler 6, demultiplexes it into optical signals 1111-11$n$1 of different wavelengths, and outputs them. The optical receivers 111-11$n$ receive the optical signals 1111-11$n$1 of different wavelengths and convert them into electric signals 1110-11$n$0, respectively. The optical output controller 9 determines based on optical reception status signals 1310-13$n$0 whether or not the optical receivers 111-11$n$ are receiving an optical signal. If they are not receiving an optical signal, the optical output controller 9 provides an optical output control signal 1210-12$n$0 to any one of the optical transmitters 101-10$n$ that has a corresponding transmitting wavelength to cause it stop outputting optical signals. This is performed in order to allow remote apparatuses to detect an unused wavelength. The optical signals 1011-10$n$1 pair up with the optical signals 1111-11$n$1, respectively, and have the same wavelength as that of their counterparts.

The optical coupler 5 receives a wavelength-multiplexed optical signal 2010 from the wavelength multiplexer 3, branches it, and outputs optical signals 2011-201$n$ including the same wavelength. The outputted optical signals 2011-201$n$ are inputted into the wavelength filters 21-1-21-$n$ of the remote apparatuses 2-1-2$n$, respectively, and each individual wavelength set in each remote apparatus is separated at the remote apparatus.

The optical coupler 6 on the other hand receives from the remote apparatuses 2-1-2-$n$ optical signals 2021-202$n$ having wavelengths used in the respective remote apparatuses, optically couples them, and then outputs a wavelength-multiplexed optical signal 2020. The outputted optical signal 2020 is inputted into the wavelength demultiplexer 4 of the station apparatus 1 and demultiplexed into optical signals 1111-11$n$1 with respective wavelengths.

Operation of the wavelength division multiplexing transmission system shown in FIG. 2 and the remote apparatuses and the station apparatus used in the system will be described below.

In the following description, operation in a case where a remote apparatus 2-$m$ (m is any positive integer ranging from 1 to n) is added will be described.

When a remote apparatus 2-$m$ is added in addition to the existing remote apparatuses, its optical transmitter 23-$m$ does not output optical signals in the initial state. Its wavelength controller 24-$m$ sends a wavelength control signal 205-$m$ to the wavelength filter 21-$m$ to adjust the wavelength to be any of the wavelengths used in the system. The optical receiver 22-$m$ can receive an optical signal 201-$m$ of that wavelength separated. The wavelength controller 24-$m$ receives from the optical receiver 24-$m$ an optical reception status signal 204-$m$ indicating whether an optical signal is being received and determines whether or not an optical signal with the corresponding wavelength is being received at the optical receiver 22-$m$. If the wavelength controller 24-$m$ determined that such an optical signal is not being received, it sets the wavelength as the wavelength to be used in the remote apparatus 2-$m$. Based on this wavelength, the wavelength controller 24-$m$ uses a wavelength control signal 206-$m$ to adjust the wavelength of the optical transmitter 23-$m$ and uses an optical output control signal 207-$m$ to control the optical transmitter 23-$m$ so as to provide an output. This causes the optical transmitter 23-$m$ to start outputting an optical signal 202$m$ of the wavelength. The wavelength controller 24-$m$ outputs a wavelength control signal 205-$m$ in order to separate the same wavelength as that is transmitted by the optical transmitter 23-$m$.

If it is determined here that an optical signal with the set wavelength is being received, the wavelength controller 24-$m$ adjusts the wavelength filter 21-$m$ such that an optical signal with another wavelength is separated. The subsequent process is the same as described above. In this way, the wavelength controller 24-$m$ changes the optical signal wavelength to be separated by the wavelength filter 21-$m$ from one to another and makes determination as described above until an optical signal wavelength that the optical receiver 22-$m$ does not receive is found. If such a wavelength is found, the wavelength is set as the wavelength used in the remote apparatus 2-$m$.

Operation of the station apparatus will be described below.

When a group of optical signals transmitted from remote apparatuses include a wavelength that the station apparatus 1 does not receive, the optical transmitter 101-10$n$ avoid transmitting optical signals of that wavelength. In other words, a wavelength-multiplexed signal 2010 outputted from the station apparatus 1 includes only the wavelengths transmitted from remote apparatuses. Therefore, before the remote apparatus 2-$m$ is added, an optical output control signal 12$m$0 from the optical output controller 9 in the station apparatus 1 prevents the optical transmitter 10$m$ from providing an output because no optical reception is found at the optical receiver 11$m$. When the remote apparatus 2-$m$ is added, an optical signal 202$m$ is outputted from the optical transmitter 23-$m$ through the operation of the remote apparatus 23-$m$ described above. The optical signal 202$m$ is optically coupled with the other optical signals in the optical coupler 6, then demultiplexed in the wavelength demultiplexer 4, and received at the optical receiver 11$m$ as an optical signal 11$m$1. Information indicating that the optical signal 11$m$1 is received is provided to the optical output controller 9 through the optical reception status signal 13$m$0. In response to the optical reception status signal 13$m$0, the optical output controller 9 uses an optical output control signal 12$m$0 to cause the optical transmitter 10$m$ to start providing an output.

Thus, bidirectional wavelength multiplexing transmission is performed between the station apparatus 1 and the added remote apparatus 2-$m$.

As has been described, according to the first embodiment, the need for preinstalling a wavelength stabilized laser having a predetermined transmission wavelength or setting a wavelength tunable laser beforehand so as to output a predetermined wavelength is eliminated. Therefore, a remote apparatus can readily be added to a transmission system according to the first embodiment.

A second embodiment of the present invention will be described below.

Figure 3:
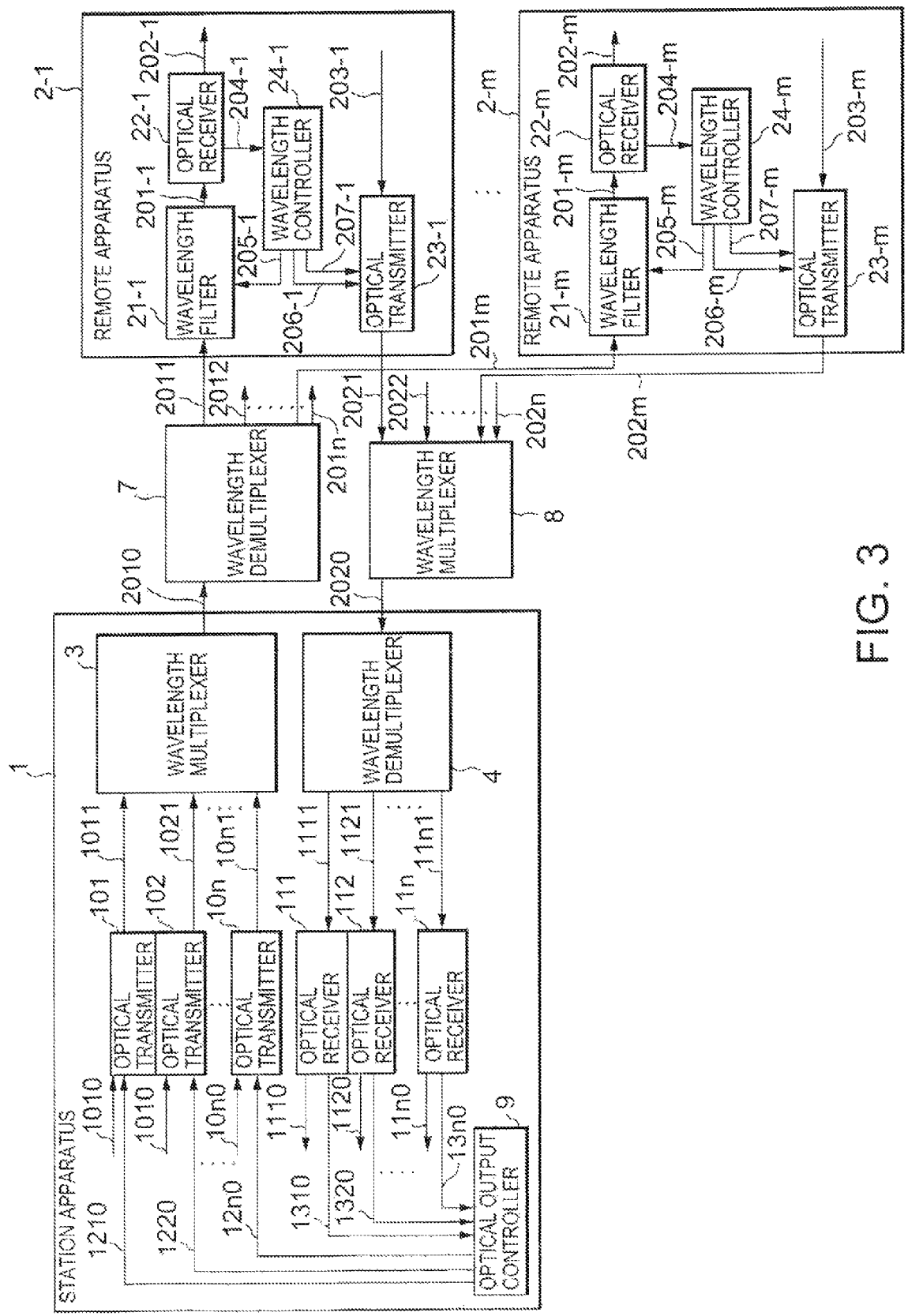
FIG. 3 is a block diagram showing a configuration of a wavelength division multiplexing transmission system according to a second embodiment of the present invention.

FIG. 3 is a block diagram of a wavelength division multiplexing transmission system and remote apparatuses and a station apparatus therein according to the second embodiment of the present invention. In FIG. 3, the same elements as those in FIG. 2 are labeled with the same reference numerals and the description of which will be omitted.

Unlike the first embodiment, the second embodiment provides a wavelength demultiplexer 7 and a wavelength multiplexer 8 in place of the optical couplers 5, 6. A wavelength demultiplexer 7 demultiplexes a wavelength-multiplexed optical signal into signals with different wavelength. A wavelength multiplexer 8 multiplexes optical signals with different wavelength into one optical signal. A wavelength-multiplexed signal 2010 sent from a station apparatus 1 is inputted into the wavelength demultiplexer 7, where it is separated into optical signals 2011-201$n$ of different wavelengths and outputted. Each remote apparatus 2-1-2-$n$ receives only one of the optical signals 2011-201$n$ that has a particular wavelength. On the other hand, optical signals 2121-202$n$ of different wavelengths sent from the remote apparatuses 2-1-2-$n$ are inputted into the wavelength multiplexer 8, where they are multiplexed, and outputted as a wavelength-multiplexed optical signal 2020.

Unlike the first embodiment, the second embodiment does not prevent optical transmitters 101-10$n$ in the station apparatus from outputting optical signals. That is, the optical transmitters 101-10$n$ of the station apparatus 1 in the second embodiment allows optical transmitter having a wavelength that is not in use to output an optical signal constantly. Therefore, when a remote apparatus 2-$m$ (m is any positive integer ranging from 1 to n), is connected to the system, any of the optical signals 2011-2-1$n$ is being outputted from a port to which the remote apparatus 2-$m$ is to be connected. The remote apparatus 2-$m$ identifies the wavelength of the optical signal, and sets the wavelength as the wavelength to use, and transmits an optical signal with the same wavelength.

Operation of the wavelength division multiplexing transmission system and the remote apparatuses and the station apparatus used in the system shown in FIG. 3 will be described below.

In the following description, operation in a case where a remote apparatus 2-$m$ is added will be described.

When a remote apparatus 2-$m$ is added in addition to the existing remote apparatuses, its optical transmitter 23-$m$ does not output optical signals in the initial state. Its wavelength controller 24-$m$ sends a wavelength control signal 205-$m$ to the wavelength filter 21-$m$ to adjust the wavelength to be any of the wavelengths used in the system. The optical receiver 22-$m$ can receive an optical signal 201-$m$ of that separated wavelength. The wavelength controller 24-$m$ receives from the optical receiver 22-$m$ an optical reception status signal 204-$m$ indicating whether an optical signal is being received and determines whether or not an optical signal with the corresponding wavelength is being received at the optical receiver 22-$m$.

While in the first embodiment all of the wave lengths in use are provided into the optical signal 201$m$ because the optical coupler 5 is used at the relay point, only an optical signal with a particular, single wavelength is provided into the optical signal 201$m$ in the second embodiment because the wavelength demultiplexer 7 is used at the relay point. Therefore, in the second embodiment, if the station apparatus 1 is not outputting an optical signal with an unused wavelength when the remote apparatus 2-$m$ is connected, the remote apparatus 2-$m$ cannot receive optical signals of any wavelengths. Consequently, the remote apparatus 2-$m$ cannot identify a wavelength to be set in it. According to the second embodiment, therefore, the station apparatus 1 always outputs an optical signal with an unused wavelength as well so that a remote apparatus can receive it and set the same wavelength in it. The remote apparatus 2-$m$ receives the optical signal 201$m$ that is being outputted constantly, identifies it, and sets it as the wavelength to be used in the remote apparatus 2-$m$. The wavelength controller 24-$m$ uses a wavelength control signal 206-$m$ to control the optical transmitter 23-$m$ to adjust its wavelength so as to be the same wavelength as the received one and then uses an optical output control signal 207-$m$ to control the optical transmitter 23-$m$ to output an optical signal. This causes the optical transmitter 23-$m$ to start outputting an optical signal 22$m$ with that wavelength. The wavelength controller 24-$m$ outputs a wavelength control signal 205-$m$ in order to separate the same wavelength as the one transmitted from the optical transmitter 23-$m$.

In contrast to the first embodiment, if it is determined that an optical signal with the wavelength set in the remote apparatus is not received, the wavelength controller 24-$m$ adjust the wavelength filter 21-$m$ so that it separates an optical signal of another wavelength, and then performs the sequence of operations described above. In this way, the wavelength controller 24-$m$ changes the optical signal wavelength to be separated by the wavelength filter 21-$m$ from one to another and makes determination as described above until an optical signal wavelength that the optical receiver 22-$m$ receives is found. If such a wavelength is found, the wavelength is set as the wavelength used in the remote apparatus 2-$m$.

Operation in the station apparatus will be described below.

All optical transmitters 101-10$n$ in the station apparatus 1, including one that outputs a wavelength not in use, are outputting optical signals. Because the wavelength demultiplexer 7, instead of an optical coupler, is used in the second embodiment, a wavelength-multiplexed optical signal 2010 is separated into optical signals 2011-201$n$ and outputted. Accordingly, only an optical signal with a particular wavelength is being outputted at each port at which each remote apparatus is to be connected. Accordingly, a remote apparatus 2-$m$ receives the optical signal with a wavelength inputted and autonomously sets that wavelength as the wavelength to use in the apparatus. That is, if a remote apparatus 2-$m$ is added, its wavelength controller 24-$m$ controls the wavelength filter 21-$m$ so as to separate wavelengths one by one, and the optical receiver 22-$m$ receives them and determines whether or not an optical signal with the corresponding wavelength is being received. If it is determined in the remote apparatus 2-$m$ that an optical signal of the particular wavelength is received at the optical receiver 22-$m$, that wavelength is set as the wavelength to be used in the remote apparatus 2-$m$.

In this way, in the second embodiment, as in the first embodiment, the need for preinstalling a wavelength stabilized laser having a predetermined transmission wavelength is eliminated. Furthermore, when a remote apparatus is added, the remote apparatus autonomously sets a wavelength to use in it and thus the need for a maintenance person to set the wavelength is eliminated: Moreover, the need for setting a wavelength tunable laser beforehand so as to output a predetermined wavelength is eliminated. Consequently, the second embodiment has an advantage that a remote apparatus can be readily added to a transmission system.

As has been described, according to the present invention, a remote apparatus includes wavelength determining means that determines an available wavelength on the basis of an optical signal received from a station apparatus. Therefore, the need for presetting a wavelength to be used is eliminated and the need for maintenance tasks concerning wavelength is also eliminated.

The present invention has an advantage that a remote apparatus can be readily attached because the remote apparatus can autonomously determine an available wavelength, set a transmission wavelength, and perform wavelength multiplexing communication with a station apparatus. The present invention has another advantage that when the wavelength to be used in remote apparatuses in a system must be changed because of a change to the system, each of the remote apparatuses can autonomously change its wavelength without the need for a maintenance person to make a change to each remote apparatus.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A wavelength division multiplexing transmission system in which a plurality of remote apparatuses are connected to a station apparatus which communicates with the remote apparatuses using a given plurality of wavelengths, wherein each of the remote apparatuses comprises:
   a receiver which receives transmissions from the station apparatus of one or more wavelengths of the given plurality of wavelengths;
   a wavelength separating device which separates, according to a wavelength control signal, a wavelength from the given plurality of wavelengths;
   a signal output device which outputs a reception status signal indicating whether or not a separated wavelength is received from the wavelength separating device; and
   a wavelength control device which generates the wavelength control signal to the wavelength separating device and receives a reception status signal to determine whether a signal corresponding to the separated wavelength is being received, and,
      if not, sets the separated wavelength as the wavelength to be used in the remote apparatus and wherein the remote apparatus transmits a signal having said separated wavelength to said station apparatus,
      but if it is determined that a signal corresponding to the separated wavelength is received, then generating a new wavelength control signal to control the wavelength separating device to separate a different wavelength from the given plurality of wavelengths until the wavelength control device determines that no signal corresponding to the separated different wavelength is being received, wherein when no signal corresponding to the separated different wavelength is being received the remote apparatus causes the station apparatus to be updated to include the separated different wavelength to be transmitted by the station apparatus with the given plurality of wavelengths.

2. The wavelength division multiplexing transmission system of claim 1, wherein the station apparatus transmits signals to the plurality of remote apparatuses using only those wavelengths used by remote apparatuses currently connected to the station apparatus.

3. The wavelength division multiplexing transmission system of claim 1, wherein each remote apparatus further comprises:
   a remote apparatus transmitter controlled by the wavelength control device, the remote apparatus transmitter initially not outputting signals until the wavelength control device generates a control signal to the remote apparatus transmitter, the remote apparatus transmitter, in response to the control signal, outputting a signal at the wavelength to be used by the remote apparatus.

4. The wavelength division multiplexing transmission system of claim 1, wherein communication between the station apparatus and the plurality of remote apparatuses is by optical signals, connections between the station apparatus and the remote apparatuses being made by optical couplers in a star topology.

5. A remote apparatus in a wavelength division multiplexing transmission system in which a plurality of remote apparatuses are connected to a station apparatus and communication is performed among the remote apparatuses and the station apparatus using a given plurality of wavelengths, the remote apparatus comprising:
   a receiver which receives transmissions from the station apparatus of one or more wavelengths of the given plurality of wavelengths;
   a wavelength separating device which separates, according to a wavelength control signal, a wavelength from the given plurality of wavelengths;
   a signal output device which outputs a reception status signal indicating whether or not a separated wavelength from the wavelength separating device; and
   a wavelength control device which generates the wavelength control signal to the wavelength separating device and receives a reception status signal to determine whether a signal corresponding to the separated wavelength is being received, and,
      if not, sets the separated wavelength as the wavelength to be used in the remote apparatus and wherein the remote apparatus transmits a signal having said separated wavelength to said station apparatus,
      but if it is determined that a signal corresponding to the separated wavelength is received, then generating a new wavelength control signal to control the wavelength separating device to separate a different wavelength from the given plurality of wavelengths until the wavelength control device determines that no signal corresponding to the separated different wavelength is being received, wherein when no signal corresponding to the separated different wavelength is being received the remote apparatus causes the station apparatus to be updated to include the separated different wavelength to be transmitted by the station apparatus with the given plurality of wavelengths.

6. The remote apparatus of claim 5, further comprising:
   a remote apparatus transmitter controlled by the wavelength control device, the remote apparatus transmitter initially not outputting signals until the wavelength control device generates a control signal to the remote apparatus transmitter, the remote apparatus transmitter, in response to the control signal, outputting a signal at the wavelength to be used by the remote apparatus.

7. A method for setting a wavelength to be used by a remote apparatus in a wavelength division multiplexing transmission system in which a plurality of remote apparatuses are connected to a station apparatus and communication is performed among the remote apparatuses and the station apparatus using a given plurality of wavelengths, the method comprising:
   transmitting from the station apparatus one or more wavelengths of the given plurality of wavelengths to the plurality of remote apparatuses and the remote apparatus to be added to said wavelength division demultiplexing transmission system;
   separating a wavelength from one or more wavelengths of the given plurality of wavelengths transmitted by a transmitter of the station apparatus, said step of separating being preformed according to a wavelength control signal;
   outputting a reception status signal indicating whether or not the separated wavelength is received; and controlling generation of a wavelength control signal used in said separating step based on said reception status signal output in said outputting step, said controlling step determining whether a signal corresponding to the separated wavelength is being received, and, if not, setting the separated wavelength as the wavelength to be used in the remote apparatus, once a separated wavelength that is not received at said remote apparatus is determined in said controlling step, transmitting a signal having said separated wavelength from said remote apparatus to said station apparatus, but if it is determined that a signal corresponding to the separated wavelength is being received, then generating a new wavelength control signal to control the wavelength separating device at the remote apparatus to separate a different wavelength from the given plurality of wavelengths until it is determined that no signal corresponding to the separated wavelength is being received, and updating said one or more wavelengths of the given plurality of wavelengths transmitted from the station apparatus to the plurality of remote apparatuses to include the separated wavelength.

8. The method of claim 7, further comprising the step of:

outputting a signal from a remote apparatus transmitter at the separated wavelength set as the wavelength to be used by said remote apparatus in said controlling step.

* * * * *